Jan. 17, 1939.　　　C. C. CARPENTER　　　2,144,255
PETRIE DISH
Filed Jan. 6, 1938
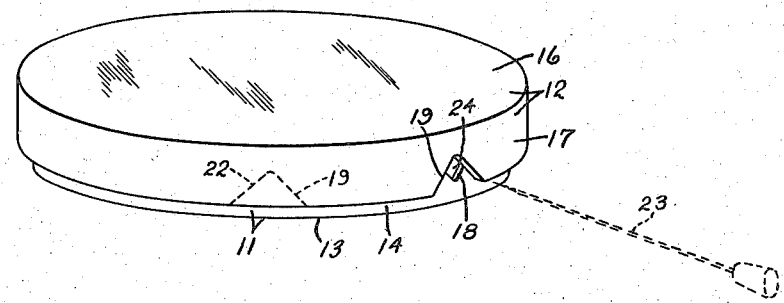
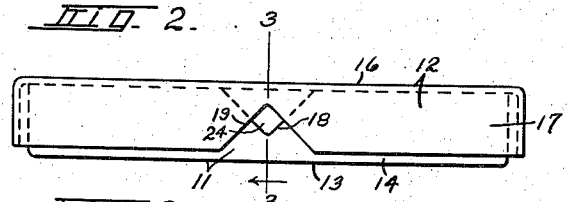
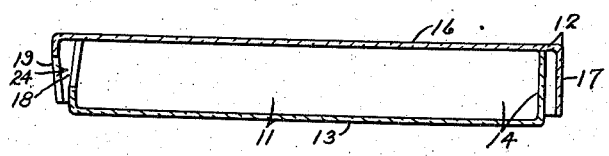
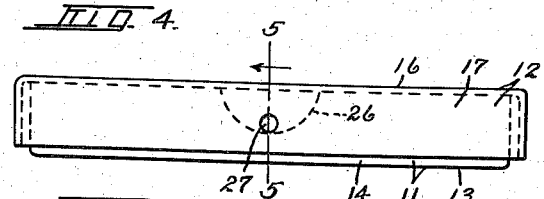
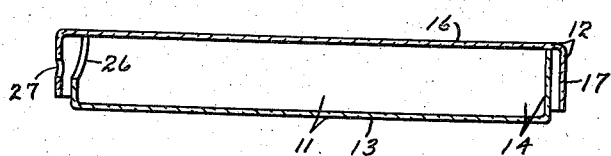
INVENTOR
CARLOS C. CARPENTER
BY
Simonton & Thomson
ATTORNEYS Patented Jan. 17, 1939

2,144,255

UNITED STATES PATENT OFFICE 2,144,255

PETRIE DISH

Carlos C. Carpenter, Syracuse, N. Y.

Application January 6, 1938, Serial No. 183,722

1 Claim. (Cl. 23—259)

My invention relates to petrie dishes.

Petrie dishes, used primarily by pathologists and bacteriologists in growing cultures of fungi and bacteria, are usually made of glass and comprise a relatively flat dish and a similarly shaped cover for the dish.

In growing a pure culture, material containing fungi, such as plant tissue or soils, is brought to the laboratory. In the laboratory, portions are selected out of such material and placed in contact with suitable media, for example media containing agar agar and starch or sugar suitable for the growth of the organism. Since nearly always the field material will contain several organisms which are difficult to distinguish in the field material, it is necessary that their growth be promoted before the different fungi may be separated from each other. Usually, to promote such growth the field material is placed in contact with the growth media either in a test tube or a moist chamber. As the different species of fungi show up in the test tube or other receptacle, they are transferred each to a separate petrie dish containing prepared media for their growth.

In growing a pure culture, it is, of course, necessary that the dish contain but a single species of fungi, and the technique of transferring the fungi from the test tube to the petrie dish is an exacting one to prevent the contamination of the separated fungus by other fungi or spores floating in the air. Usually a platinum wire or needle having an aluminum handle is used for making the transfer of fungi from the test tube or other receptacle to the petrie dishes. Before the wire is inserted into the mass of the organism to be transplanted to sterilize it, it is heated to the incandscent stage in the flame of a gas burner. The wire is then allowed to cool so that it will not injure the cells to be transferred. When the wire or needle has cooled, it is placed in contact with the spore mass to be transferred or inserted in the tissue growth of the desired fungi. Some spores or cells will nearly always adhere to the needle or wire which is then withdrawn from the receptacle containing the growth. While, at times, an undesired spore floating in the air will adhere to the wire, this source of contamination of the desired fungus is relatively infrequent. The greater source of contamination occurs when the cover of the petrie dish is opened and the wire having the desired fungi thereon inserted into the petrie dish.

In making the transfer, the petrie dish, which has been previously sterilized and contains the desired media for growth, usually agar agar and starch or sugar, is opened to the slightest degree possible by lifting the cover and the needle or wire is inserted in this opening. The needle with the adhering fungi is stabbed into the media in the petrie dish, withdrawn, and the dish quickly closed. If, after a few days time, more than one organism is visible in the dish, then the process has to be repeated until a pure culture is obtained. Primarily because of accidental contamination, the process frequently must be repeated a number of times.

The principal source of contamination occurs, as mentioned above, when the petrie dish cover is raised for insertion of the needle, and this source of contamination is largely eliminated by the petrie dish of my invention. While the dishes, when closed, are not sealed, as access of air to the dish is necessary for growth, a suction is created adjacent the opening between the dish and the cover which tends to draw spores floating in the air or lying on the table adjacent the dish into the dish. The presence of a suction tending to draw air into the dish when the cover is raised is easily demonstrated by opening the dish when surrounded by smoke.

An object of my invention is to provide a petrie dish, the cover of which need not be raised when the desired transfer of fungi to the petrie dish is made.

Another object of my invention is to provide a petrie dish in which the dish and its cover are provided with notches, cut-out portions or openings, which may be brought into registry to provide an opening into the dish to enable insertion of the needle upon which the desired fungi have fastened themselves.

Other objects and advantages of my invention will become apparent from the following description when taken in connection with the accompanying drawing, in which:

Figure 1 is a perspective view of my novel petrie dish.

Figure 2 is a side elevation of the petrie dish of Figure 1.

Figure 3 is a view taken on the line 3—3 of Figure 2.

Figure 4 is a side elevation of a modified form of my novel petrie dish.

Figure 5 is a view taken on the line 5—5 of Figure 4.

The petrie dish of my invention comprises a dish 11 and a cover 12. The dish 11 comprises a bottom 13 having substantially vertically extending side walls or an annular rim 14. The cover 12 has a top 16 and depending side walls or an annular rim 17. The cover is somewhat larger in diameter than the dish so that the dish and cover may be placed in the superimposed relationship shown in Figure 1. In accordance with my invention, the upstanding wall or rim 14 of the dish is provided with a cut-out notch or opening 18, and the depending wall or rim 17 of the cover is provided with a similar notch 19. The cover may be rotated with respect to the dish so that the notch 19 lies in the dotted line position shown at 22, in which position there can be no direct draft of air into the petrie dish.

When it is desired to insert the platinum wire or inoculating needle 23 into the dish for the purpose of transferring fungi on the end of the needle into the dish, the cover is rotated so as to bring the notches 18 and 19 into registry to form an opening 24. The needle may be inserted through this opening for stabbing the prepared media of agar agar and starch or sugar, or other media. The cover is then quickly rotated to the dotted line position of Figure 1.

It will be appreciated that as the dish is always open to indirect access of air, that the pressure of air in the dish will be the same as outside of the dish, and that no substantial flow of air will take place into the dish when the notches are in registration. Moreover, when the notches are in registry for the insertion of the needle, since the opening 24 is made as small as possible, the likelihood of contamination of the culture is small. Since the notches are in registry only when the nedle is to be inserted, a spore is unlikely to float into the dish and contaminate the culture during growth. One of the advantages of my petrie dish is that the mouth of the notch or opening 19 may be subjected to the flame of a Bunsen burner to sterilize the mouth of the opening.

In Figure 4, I have shown a modification of my invention wherein vertical rim 14 of the dish 11 is provided with a semi-circular cut-out portion shown in dotted lines at 26. The vertical rim 17 of the cover 12 is provided with a small opening 27. The opening 27 is brought into registry with the cut-out portion 26 when the needle is to be inserted and, as soon as the insertion has been made the cover is rotated so that no direct opening into the dish is present.

It will be appreciated that I have provided a petrie dish in which the operation of transferring fungi into the dish may be conveniently carried out with a considerable decrease in the possibility of contaminating the culture. It will further be appreciated that various modifications in the form and relation of parts may be made without departing from the spirit of my invention as set forth in the appended claim.

I claim:

A petrie dish for the growing of cultures comprising a glass dish portion and a glass cover, said dish portion having a bottom and an integral upstanding cylindrical rim, said cover having a top, the under side of which rests on the upper edge of the rim of said dish portion and an integral depending cylindrical rim, the internal diameter of which is greater than the external diameter of the rim of said dish portion and which is spaced from and overlaps the latter, whereby said cover may be freely rotated upon said dish portion without separating the same from one another, an opening in the rim of said dish portion and a second opening in the overlapping rim of said cover, said openings being so located as to be capable of being brought into registry or out of registry by rotation of said cover while the top thereof is in contact with said upper edge of said dish portion, whereby when said openings are out of registry the contents of said dish are protected from outside air currents and when said openings are registered a needle may be inserted therethrough without substantial danger of contamination of the contents of said dish by the outside air during the period required for insertion of said needle.

CARLOS C. CARPENTER.